March 19, 1968     B. T. HEURTEBISE     3,373,630
STEERING COLUMN ASSEMBLY
Filed April 29, 1966
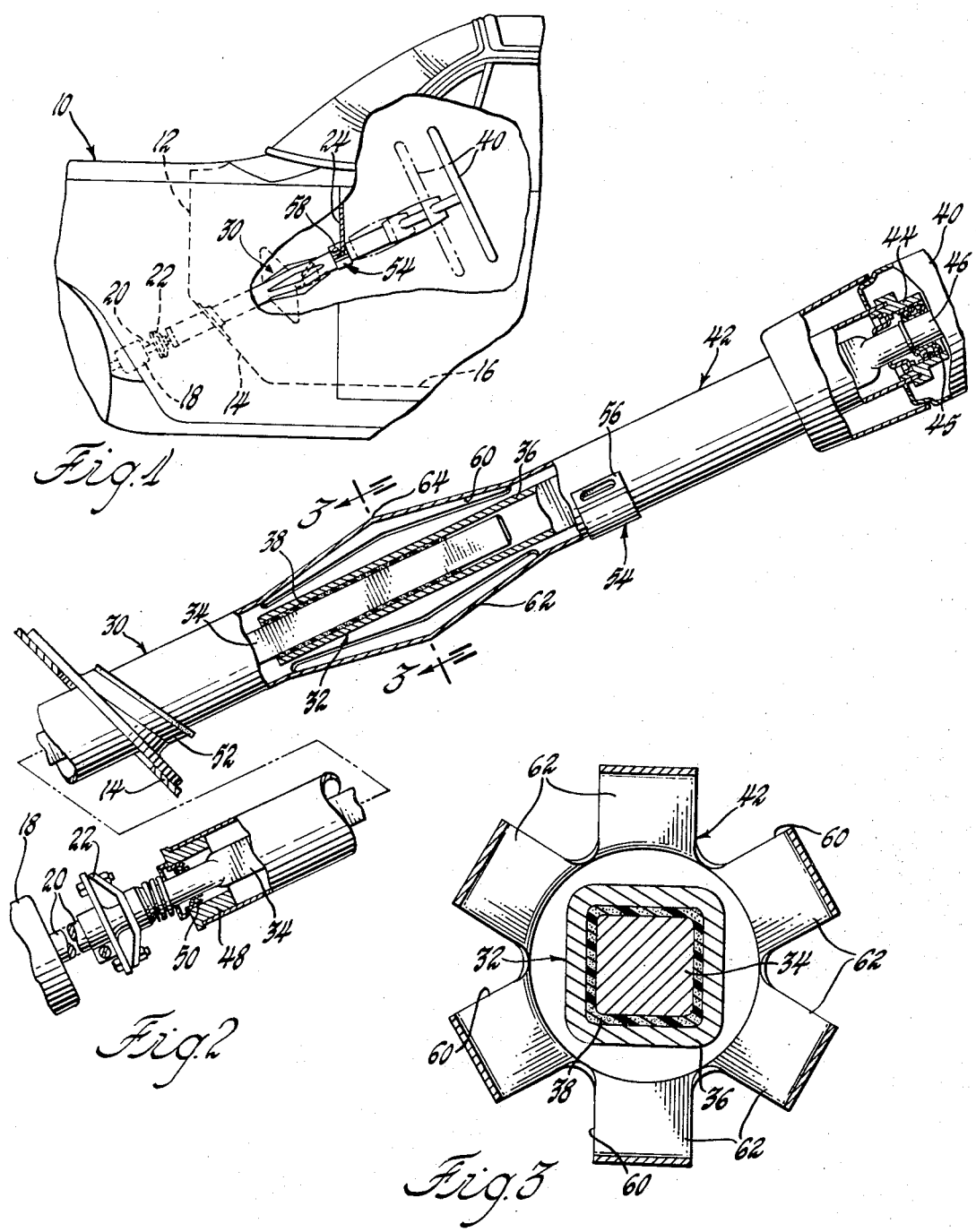
INVENTOR.
Byron T. Heurtebise
BY
W. S. Pettigrew
ATTORNEY United States Patent Office 3,373,630
Patented Mar. 19, 1968

3,373,630
STEERING COLUMN ASSEMBLY
Byron T. Heurtebise, Milford, Mich., assignor to General Motors Corporation, Detroit, Mich., a corporation of Delaware
Filed Apr. 29, 1966, Ser. No. 546,313
9 Claims. (Cl. 74—492)

This invention relates to vehicle steering column assemblies and more particularly to collapsible steering column assemblies for vehicles.

One object of this invention is to provide a new and improved collapsible steering column assembly for use in vehicles. Another object of this invention is to provide a new and improved collapsible steering column assembly wherein one or more of the columnar members thereof is constructed and arranged to readily structurally deform under impact loading thereon and to absorb the energy of such impact. A further object of this invention is to provide a steering column assembly including a telescopic steering shaft and a support member supporting the steering shaft on the vehicle, the support member being constructed to readily yield under impact on the steering shaft and thereafter plastically deform for absorption of impact energy and controlled resistance to telescopic movement of the steering shaft. Still another object of this invention is to provide a steering column assembly including a tubular energy absorbing member interposed between the body and the steering shaft and provided with slots forming radially offset strips which are subject to column buckling or similar distortion under impact and which will undergo controlled plastic deformation beyond yield to absorb the impact.

These and other objects, features and advantages of the invention will be readily apparent from the following specification and the drawings wherein:

FIGURE 1 is a fragmentary partially broken away elevational view of an automotive vehicle body including a steering column assembly according to this invention;

FIGURE 2 is an enlarged partially broken away view of a portion of the steering column assembly; and FIGURE 3 is an enlarged sectional view taken generally along the plane indicated by line 3—3 of FIGURE 2.

Referring now particularly to FIGURE 1 of the drawings, the steering column assembly of the invention is shown arranged within the passenger compartment of an automotive vehicle body 10 conventionally provided with a forward fire wall 12 joined with a somewhat angularly disposed toepan 14 which further merges with the body floorpan 16, all indicated in broken lines. Conventionally located forward of the toepan 14 in the engine compartment is the usual steering gear including a reduction gear box 18 suitably fixed to the frame or other rigid portion of the vehicle, and having a steering input stub shaft 20 mounting an isolation or flex coupling 22.

Although not shown in detail, the vehicle body also includes the conventional instrument panel structure including a wall portion 24 suitable for the mounting of one end portion of the steering column assembly as will hereinafter be described.

The steering column assembly of the invention, designated generally as 30, includes a telescopic steering shaft subassembly 32 including a lower shaft 34 of generally square or rectangular cross section and an upper tube 36 similarly shaped in cross section and slidably received somewhat loosely over the shaft 34, FIGURES 2 and 3. The clearance or cavity intermediate the shaft and tube may be filled with any known potting compound 38 having properties suitable for prevention of rattling between the members, but presenting no appreciable resistance to telescoping movement thereof. The shaft 34 extends through the toepan 14 and is splined or otherwise nonrotatably connected at its lower end to the upper portion of the flex coupling 22. The tube 36 extends rearwardly of the body past the wall portion 24 of the instrument panel and mounts at its extreme upper end by a spline connection or otherwise a conventional steering wheel 40.

In accordance with the invention, an energy absorbing support member or jacket 42 mounts the steering shaft subassembly 32 on the body 10, the jacket in the preferred embodiment shown being cylindrical and generally coextensive with the steering shaft subassembly. At its upper end, jacket 42 has mounted thereto a steering shaft bearing block 44 carrying a ball bearing assembly 45 which supports a round extension 46 of the tube 36, to which is mounted the hub of the steering wheel 40. At its lower end, the jacket 42 extends through the toepan 14 and mounts a bearing block 48 in turn mounting a bearing assembly 50 encircling a round end of the shaft 34. A grommet 52 of rubber or the like is slidably received over the jacket 42 and bears against the toepan 14 to prevent entry of dust, moisture, etc., into the passenger compartment.

Adjacent its upper end, the jacket 42 has placed thereover a separate generally U-shaped bracket 54 the ears 56 of which have elongated slots which receive bolts 58 or the like in the wall portion 24 for vertically supporting the steering column assembly 30 thereon, FIGURE 1. The bracket, however, presents no appreciable resistance to forward axial sliding movement of jacket 42 relative to the wall portion 24.

Referring to FIGURE 2, the jacket 42 is provided intermediate its ends with a circumferential series of slots 60 of predetermined length, providing a number of strips 62. The strips 62 are radially offset midway their length at 64 a predetermined degree from the remaining portions of the jacket 42, thereby to take a shallow V-shaped configuration in profile.

In the event of a substantial impact loading on the steering wheel 40 in a forward direction, the steering wheel immediately bottoms on bearing block 44, and with the steering shaft subassembly 32 being substantially freely telescopeable and the bracket 54 readily disengageable from wall portion 24, the impact loading will be effectively resisted only in the jacket 42. The impact loading immediately bottoms the bearing block 48 on the flex coupling 22 and this in turn on the frame mounted steering gear box 18, setting up a substantially rigid reaction point for the impact. With such reaction established, strips 62 are loaded in compression and subjected to a tendency toward induced column buckling operative to allow forward axial displacement of the upper portion of the jacket 42 as indicated in FIGURE 1 in broken lines, such displacement of course being accompanied by telescoping of steering shaft subassembly 32. The preformed radial offset of strips 62 provides for predictable buckling thereof in that they are induced to deform radially outwardly in uniform manner. Further to controlling the direction of buckling, the degree of radial offset also determines the loading necessary to begin the structural deformation of the strips. When impact loaded to yield, the strips 62 are operative to absorb energy of the impact and impart a controlled resistance or retardation to steering column collapse, directly from the plastic deformation or working done on the strips.

The amount of retardation or energy absorption available to strips 62 will depend on their material properties, wall thickness, width, length, preformed radial offset, etc. The strip cross section may be varied at the principal strain areas adjacent the ends of the slots and at the offset point 64, or the strips may be given a preformed twist; i.e., circumferential displacement of the offset point 64 from the two ends of the strip, to vary the yield load and energy absorption therein.

Further, if found desirable, the single energy absorbing section of the jacket 42 may be replaced with a number of smaller such sections so that the radial expansion of the jacket 42 is reduced. Also, rather than having a single radial offset 64, it may be practical to provide an axial series of radial outward and radial inward offsets in each strip whereby to derive more high strain areas therein.

Having thus described the invention, what is claimed is:

1. In a vehicle including a steering gear, a steering column assembly comprising, telescopic steering shaft means operatively connected at one end thereof to said steering gear and at the other end thereof to a manual steering instrumentality, and a support member mounted on the vehicle and arranged about said shaft means for supporting the same on the vehicle for normal operation of said steering gear by the steering instrumentality, said support member including an energy absorbing portion arranged to structurally yield upon the application of a predetermined impact thereto and thereafter plastically deform at a controlled rate for controlled resistance to telescoping movement of said shaft means.

2. A steering column assembly as recited in claim 1 wherein said support member includes tube means enclosing and supporting said shaft means, one end of said tube means being mounted on the vehicle in a manner providing for reaction in the vehicle to impact on said tube means in one direction, the other end of said tube means being releasably mounted on the vehicle in a manner permitting axial displacement of said other end relative thereto in said one direction, said energy absorbing portion being located intermediate said ends of the tube means.

3. A steering column assembly as recited in claim 1 wherein said support member includes tube means provided with slots defining energy absorbing strips subject to controlled deformation under said predetermined impact.

4. A steering column assembly as recited in claim 3 wherein said strips are provided with predetermined radial offset intermediate the ends of the slots.

5. In a vehicle including a steering gear, a steering column assembly comprising, telescopic shaft means operatively connected at one end thereof to said steering gear and at the other end thereof to a manual steering instrumentality, and energy absorption tube means interposed between said shaft means and the vehicle operative to impart controlled resistance to telescoping movement of said shaft means under predetermined impact thereon, said shaft means being mounted for rotation within said tube means, said tube means having slots therein defining strips of predetermined length and cross section subject to controlled column buckling under said predetermined impact.

6. A steering column assembly as recited in claim 5 wherein said strips are provided with predetermined radial offset intermediate the ends of the slots.

7. In a vehicle steering mechanism of the type including a steering gear and telescopic steering shaft means operatively connected to the steering gear, an energy absorbing support jacket mounted adjacent both of its ends on the vehicle and enclosing and rotatably supporting said steering shaft means, said jacket being provided intermediate its ends with circumferentially spaced axially extending slots defining a plurality of energy absorbing strip elements arranged to yield in generally radial direction under a predetermined impact force on said jacket.

8. In a vehicle steering mechanism as recited in claim 7, said strip elements being formed with portions intermediate their ends expanded radially outwardly therefrom.

9. In a vehicle steering mechanism as recited in claim 7, means for mounting one end of said jacket on the vehicle for reaction therein to axial forces applied to said jacket in one direction, and means for releasably mounting the other end of said jacket on the vehicle in a manner permitting axial displacement of said other end in said one direction.

References Cited

UNITED STATES PATENTS

| 2,236,079 | 3/1941 | Wipper | 85—71 |
| 3,262,332 | 7/1966 | Wight | 74—493 |

FOREIGN PATENTS 776,249   6/1957   Great Britain.

MILTON KAUFMAN, *Primary Examiner.*